United States Patent
Glatzel et al.

[11] 3,738,739
[45] June 12, 1973

[54] HIGH LIGHT INTENSITY PHOTOGRAPHIC LENS OF THE EXTENDED GAUSS TYPE

[75] Inventors: Erhard Glatzel; Erwin Konschack, both of Heidenheim, Germany

[73] Assignee: Carl-Zeiss-Stiftung, Wurttemberg, Germany

[22] Filed: Mar. 17, 1972

[21] Appl. No.: 235,578

[52] U.S. Cl. ................ 350/214, 350/176, 350/215
[51] Int. Cl. .......................... G02b 9/62, G02b 9/64
[58] Field of Search ................. 350/314, 315, 176, 350/177, 183

[56] References Cited
UNITED STATES PATENTS

| | | |
|---|---|---|
| 3,351,412 | 11/1967 | Solisch et al. .................. 350/214 X |
| 3,545,844 | 12/1970 | Takahashi et al. ................ 350/214 |
| 3,612,663 | 10/1971 | Tronnier et al. ................ 350/215 X |

Primary Examiner—John K. Corbin
Attorney—Charles Shepard and Stonebraker & Shepard

[57] ABSTRACT

A photographic lens of the extended Gauss type, with a high relative aperture, having a single air spaced positive element behind the rear Gauss component, and a plurality of air spaced positive elements in front of the forward Gauss component. Eight specific embodiments are disclosed, and constructional rules or formulae are developed, to enable the production of other specific structures embodying the invention.

10 Claims, 8 Drawing Figures

HIGH LIGHT INTENSITY PHOTOGRAPHIC LENS OF THE EXTENDED GAUSS TYPE

SUMMARY OF THE INVENTION

The present invention relates to high light intensity lenses of the extended GAUSS type, which, with a relative aperture of up to 1 : 2.0 and over, up to more than 1 : 1.8, make it possible to focus, with very high definition, an effective field of vision of which the diameter is greater than 0.8 F, these lenses being of very compact construction and also having on the image side a free width of cut for the remote subject, the said width of cut being greater than two-thirds of the equivalent focal length F. This makes it easier to use these new lenses in reflex cameras, if required, in addition to the fact that the new compact construction makes it possible to adopt such favourable mechanical dimensions for the lenses that the ample extra allowance hitherto known to be required in the dimensioning of the structural elements on the object side, in order to focus the side parts of the field of vision with only the minimum vignetting effect can be dispensed with.

To achieve this object the new lenses are so constructed that the two modified GAUSS halves, i.e., the front component, on the object side, and the rear component, on the image side, enclose between them a highly dispersive biconvex central vertex gap CS, in such a manner that this inner air space CS, containing any diaphragm, which is then predominantly of variable aperture, is enclosed by two meniscus-shaped dispersion elements $N_1$ and $N_2$ in such a way that the outer surfaces belonging to these two negative menisci and in direct contact with air are concave towards the said air space, in addition to which at least one of these two negative menisci is made up of at least two individual lenses of which the mutually adjacent surfaces, in the event of equality of radius of curvature, can be cemented, if the direction of these surfaces is of the same sign. To ensure the maximum possible width of cut on the image side, the negative meniscus $N_2$ of the new lenses will preferably be followed solely by one unequal-sided collecting element, as viewed in the direction of the shorter conjugated member, while the other negative $N_1$ is preceded, as viewed in the direction of the object side, by at least three predominantly separate structural elements which are exposed to the air and of which, in relation to one another and to the negative $N_1$ delimiting the front component Vgl, are specifically dimensioned as follows:

a. the lens components which, as viewed in the direction of the longer conjugated member, precede the negative $N_1$ situated on the side of the inner biconvex air space CS, contain at least two menisci ($P_{II} = L_\beta$ and $P_{III} = L_\gamma$), in each case delimited on both sides by an air space, and of positive refraction power, the sum of the surface refractive powers $(\phi_\beta + \phi_\beta + \phi_\gamma + \phi_\gamma + \phi_\gamma)$ of these two positive menisci being greater than 1.23 times the equivalent refractive power $\Phi$ of the total lens system but less than 1.65 $\Phi$ these two positive menisci being preceded, as viewed in the direction of the object space(longer conjugated member), by at least one third positive component($P_I = L_\alpha$), while at the same time b. the third collecting structural element ($P_I = L_\alpha$), which precedes the said two positive menisci on the object side, and which, as viewed in the direction of the light, from the object side, constitutes the front structural element, is provided, like each of the two subsequent positive menisci($P_{II} = L_\beta$ and $P_{III} = L_\gamma$) with one surface with a convexity towards the longer conjugated member, these three surfaces having among themselves a progressively increased curvature from the side of the longer to the shorter conjugated member(the reciprocal lengths of radii thus being $\rho = 1 : R$), while the curvature difference($\Delta \alpha, \beta$) between the front surfaces of the collecting lens on the object side and of the inner positive meniscus, based on the equivalent refraction power or force $\Phi = 1$ (as the reference unit), is selected between a lower position range limit of 0.600 on the one hand and an upper limit of 1.475 on the other, and the curvature difference($\Delta \beta, \gamma$) (likewise based on $\Phi = 1$) between the front surface of the inner positive meniscus and that of the last collecting front-component meniscus, which is the subsequent one as viewed in the direction of the light to the first negative $N_1$, between a lower position range limit of 0.900 on the one hand and an upper limit of 1.350 on the other, in addition to which the space S preceding the said negative $N_1$, to the added third positive($P_{III} - L_\gamma$), is given the meniscal shape required to ensure that the limiting surfaces enclosing the said space will be given a curvature difference ($\Delta_{(S)}$) — based on the equivalent focal length F = 1 and thus on the equivalent refraction power $\Phi = 1$ — of which the absolute values are less than 0.625, but without falling below the minimum value of 0.410, while, in addition, c. the positive meniscus($P_{III} = L_\gamma$)directly preceding the negative $N_1$ is so constructed that its hollow surface, which delimits the finite air space S enclosed in the direction of the subsequent negative $N_1$, and which in respect of the direction of the light constitutes the rear surfacem has a considerable dispersion effect, of which the surface refraction power ($\phi'_\gamma$)is greater than $-0.765$ $\Phi$, but without exceeding the value of $-1.580$ $\Phi$, while at the same time the positive meniscus($P_{II} = L_\beta$) which precedes this meniscal collecting lens ($L_\gamma$) in the direction of the longer conjugated member, in a finite air gap, likewise has dispersive concave rear surface which is given the dimensions required to ensure that its surface refraction power($\phi_\beta'$) combined with the aforementioned dispersive surface refraction power ($\phi_\gamma'$), i. e. the sum($\phi_\beta' + \phi_\gamma'$)of the refraction powers, is greater than $-0.975$ $\Phi$, but without exceeding the value $-1.950$ $\Phi$, wherein, in accordance with scientific practice, the symbol $\phi$ is adopted for the equivalent refraction power of the total lens system and the surface refraction powers of the individual lens surfaces are expressed as $\phi = (n'-n):R = (n'-n)\rho$ and the lens refraction powers as $\phi$ (as the sum of the surface refraction powers $\phi + \phi'$ in the direction of the light for the front and for the particular rear lens surface which faces towards the shorter conjugated member), in addition to which, within the framework of the over-all combination provided by the invention, the further dimensional rule is fulfilled according to which d. the negative value of the quotient resulting from the division of the sum of the lens refraction powers ($\phi_\beta + \phi_\gamma$) of the inner and of the third collecting meniscus, which latter is separated from the meniscal negative $N_1$ by an air gap and directly precedes it, by the sum of the surface refraction powers($\phi_\beta' + \phi_\gamma'$) of the two rear dispersion surfaces of these two lenses, these surfaces being hollow towards the shorter conjugated member, is smaller than 1.500 but does not fall below 0.705, the said quotient being abbreviated as follows:

$$Q(\beta, \gamma) = (\phi_\beta + \phi_\gamma) : (\phi_\beta' + \phi_\gamma')$$

The following are the formulae by which the separate characteristics of this combination of the new constructional rules according to the invention are expressed:

$$1.23\, \Phi < (\phi_\beta + \phi_\gamma) < 1.65\, \Phi \tag{a}$$

$$0.600 < \Delta_{\alpha,\beta} < 1.475 \tag{$b_1$}$$

$$0.900 < \Delta_{\beta,\gamma} < 1.350 \tag{$b_2$}$$

$$0.625 > \Delta_{1S)} > 0.410 \tag{$b_3$}$$

$$0.765\Phi < -\phi_\gamma' < 1.580\, \Phi \tag{$c_1$}$$

$$0.975\Phi < (\phi_\beta'\, \phi_\gamma') < 1.950\, \Phi \tag{$c_2$}$$

$$1.500 > -Q(\beta, \gamma) < 0.705 \tag{d}$$

the meanings of the above abbreviations being given hereunder in the same order:

$\phi_\beta$ = lens refraction power or force of inner positive meniscus($P_{II}$).

$\phi_\gamma$ = lens refraction force of the positive meniscus($P_{II} = L_\gamma$) immediately preceding the negative $N_1$.

$\Delta_{\alpha,\beta}$ = curvature difference of the front surfaces ($\rho_\beta - \rho_\alpha$) of the first collecting lens($P_I = L_\alpha$) and of the inner positive menuscus($P_{II} = L_\beta$)

$\Delta_{\beta,\gamma}$ = curvature difference of the front surfaces($\rho_\gamma - \rho_\beta$) of those positives the second ($P_{II} = L_\beta$) and third ($P_{III} = L_\gamma$) as viewed in the direction of light in the front component on the object side which are $\Delta_{1S)}$ = curvature difference ($\rho_\gamma' - \rho_{N_1}$) of the two limiting surfaces of the air gap between the third positive($P_{III}$) and the negative $N_1$ subsequent to it in the direction of the light.

The above new constructional rules thus indicate, in turn, that the positive menisci $P_{II}$ and $P_{III}$ which follow the collecting front component $P_I$ in the direction of the meniscal negative $N_1$ terminating the front component Vgl and which are in contact on both sides with air are to be dimensioned in such a way as to ensure the progressive image performance, accompanied by a compact structure for the said front component, with that minimum value of its summated lens refraction forces(as the sum of its surface refraction forces) which characterizes the invention — based on the equivalent refraction force $\Phi$ as the unit — but without exceeding the maximum value, characterizing the invention, in order to avoid the aberrations of higher order which prove so disadvantageous from the point of view of progressive image performance. This latter purpose is also served by the subsequent set of characteristics ($b_1$ to $b_3$), by which the curvature differences of the lens surfaces — likewise based in the equivalent refraction force $\Phi = 1$ — on the side of the longer conjugated member, as far as the negative $N_1$ delimiting the front component Vgl, are dimensioned to ensure that the front surfaces of these first three collecting components, in the direction of the light, with increasing convergence of the parallel rays entering the lens system without undergoing aberration, will likewise have increasing surface curvatures, so that the angles of incidence of these finitely opened rays will be kept relatively small, in accordance with the accepted theory, this result nevertheless being achieved, in contrast to existing prior art, without having to select these curvature differences outside the new position ranges, in accordance with the separate characteristics $b_1$ and $b_2$, in addition to which, in the separate characteristic $b_3$, the specific selection, within the same range of action, of the curvature difference of the two adjacent surfaces which surround the air space S between the third collecting lens $P_{III}$ and the subsequent negative meniscus $N_1$ and which are hollow towards the image plane, belomgs in the same manner to this partial complex of the total combination of characteristics.

Further, the part-characteristics $c_1$ and $c_2$ stipulate the position ranges provided by the invention for the surface refraction forces of those hollow surfaces of the two positive menisci($L_\gamma$ and $L_\beta$) in contact with the air which face towards the negative $N_1$ and thus towards the shorter conjugated member, the said ranges opening the way, in particular, for a progressive image performance in the lateral field of vision, with the utilization of widely opened pencils of rays, while the characteristic d serves for further refinement of the course taken by the position of the lateral image shells.

In the examinations of the new widened GAUSS lens systems based on the foregoing constructional principle it has also been found that the image combination can be further refined, particularly as regards astigmatism and the course taken by the latter in the respective zones, can be further refined in a particularly easy manner, in accordance with the characteristic of the subsidiary claim, in that the meniscal collecting lens $P_{III} = L_\gamma$, preceding the negative $N_1$ situated at the last point in the front component Vgl, and occupying, as viewed in the direction of the light, the third position from the side of the longer conjugated member, is given the refraction power distribution required to ensure that the quotient resulting from dividing its lens refraction power($\phi_\gamma = \phi_\gamma + \phi_\gamma'$) by the surface refraction power $\phi_\gamma'$ of the rear hollow surface associated with the air space S towards the negative $N_1$ is less than two-thirds but greater than the lower limit of one-third, i.e., that this positive meniscus $P_{III} = L_\gamma$ is given a rear surface refraction power with a highly dispersive and thus over-correcting effect in relation to the lens refraction power of this collecting lens, in order to relieve the over-correction effect of the subsequent negative $N_1$ delimiting the front component. This additional dimensional rule, expressed as a formula, reads:

$$\tfrac{2}{3} > -(\phi_\gamma / \phi_\gamma') > \tfrac{1}{3} \tag{e}$$

The data tables which follow give eight examples of the new lens systems of the extended GAUSS type in accordance with the present invention, all of them being dimensioned in accordance with the new constructional principle laid down and based on the equivalent focal length F as the unit. The basic construction principle consists of the combination of the foregoing separate characteristics (a) to (d). Four of the said examples also satisfy the conditions of characteristic (e) of the subsidiary claim. The said data tables for the examples of the invention give the radii of curvature R of the lens surfaces, numbered continuously from the front surface in the direction of the image. In the same number order, the lens thicknesses measured along the optical axis are marked d and the air distances between the axial vertices of the individual lens parts are marked s, while the refraction indices of the glasses used are marked n in the same sequence of symbols.

If these lens systems, in accordance with the purposes contemplated, are only to be used for a very narrow spectral range, the aforementioned refraction index refers to the said narrow spectral range. If the new lenses are to be used for images required to cover a spectral range of finite width, the so-called monochromatic image error correction is to be replaced by achromatization over the wide spectral range then required, for which purpose the glasses, in a manner known per se, are so defined that by their respective $\nu$ values (ABBE number) the necessary colour dispersion of the glasses used then serves to eliminate the relevant wave-length-governed chromatic deviations.

Within the framework of the invention it has been confirmed that for the development of the so-called initial forms (preliminary form) for the anastigmatic lenses according to the invention, it is then possible, in the course of the subsequent technical rough production stage (crude form), in the known manner, with the standard first correction in the SEIDEL range (or 3rd order) then normally adopted, to make use of one of the standard refraction indices, e.g., for the d- or e-line of the visible spectrum, with a wave length of 5876 or 5461 A units, such as are obtainable at any time from the glass catalogues of manufacturers of optical glasses.

DESCRIPTION OF THE PREFERRED EMBODIMENTS

Figure 1:
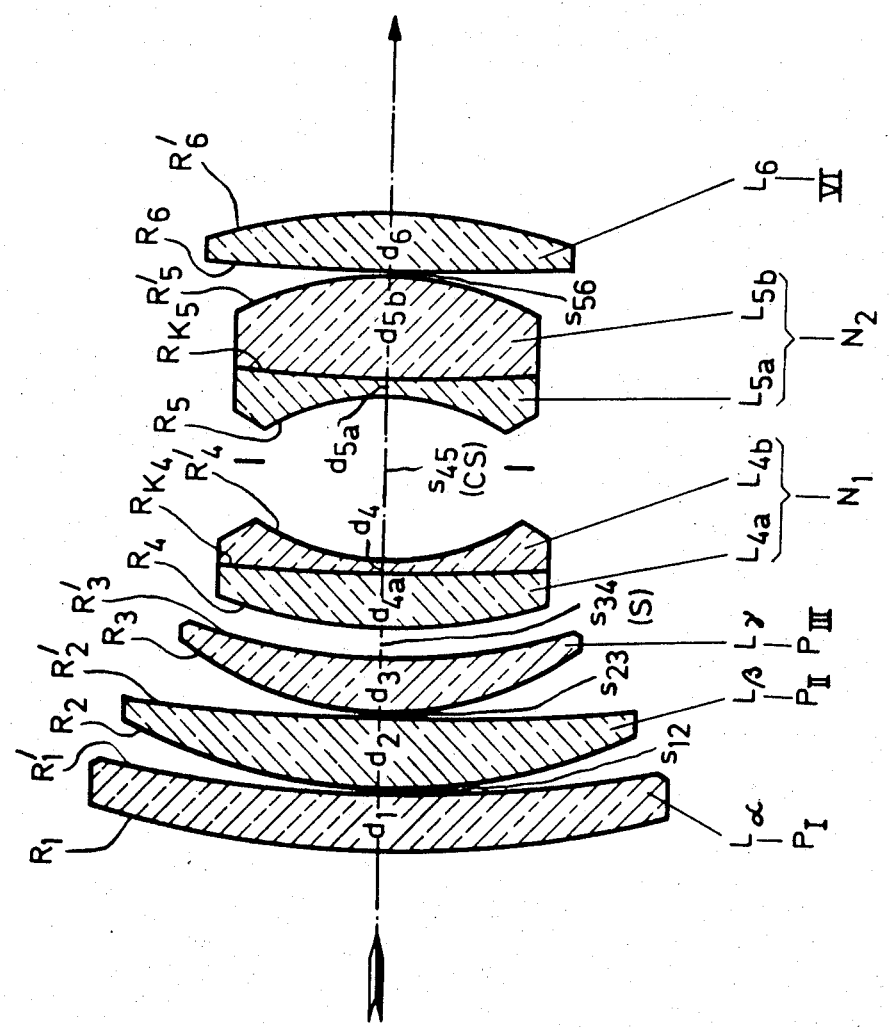
FIG. 1 is a lens diagram illustrating a lens according to a first embodiment of the present invention.

In the following examples of the new lens systems according to the invention, Ex.1(FIG. 1) first of all shows a monochromatically pre-corrected initial form serving for the production of an extended GAUSS lens system of which the relative aperture is about $f/2.3$ and in which the two negative menisci $N_1$ and $N_2$ enclosing the maximum internal air space CS represent a pair, each made up of two individual lenses cemented together and of opposite intensity sign. This construction for the two negatives corresponds to the most widely adopted construction for this inner part of high light intensity GAUSS variations. If, however, the light intensity of these lens systems is to be increased beyond a relative aperture of $f/2.0$ and a particularly compact construction at the same time to be obtained, then the installation of the negative $N_1$ delimiting the front component, in the form of a combined structural element, very often involves serious and frequently insuperable difficulties, for purely mechanical reasons, owing to the very small internal space available in the front mounting tube of the central shutter bearing the front component or of the front installation socket of the diaphragm mount. In this space, limited for mechanical reasons, a comparatively thick negative component, of considerable diameter, owing to the large relative aperture, cannot be accommodated at this point without an undesirable increase in the mechanical dimensions of the lens installation parts. The desired compact structure is nevertheless obtained as a result of the fact that this negative $N_1$ on the side of the front component is constructed as an individual lens of the form of a negative meniscus, which latter can then be given a very limited axial thickness, rendering it much easier to build it into a very compact lens mount.

Figure 2:
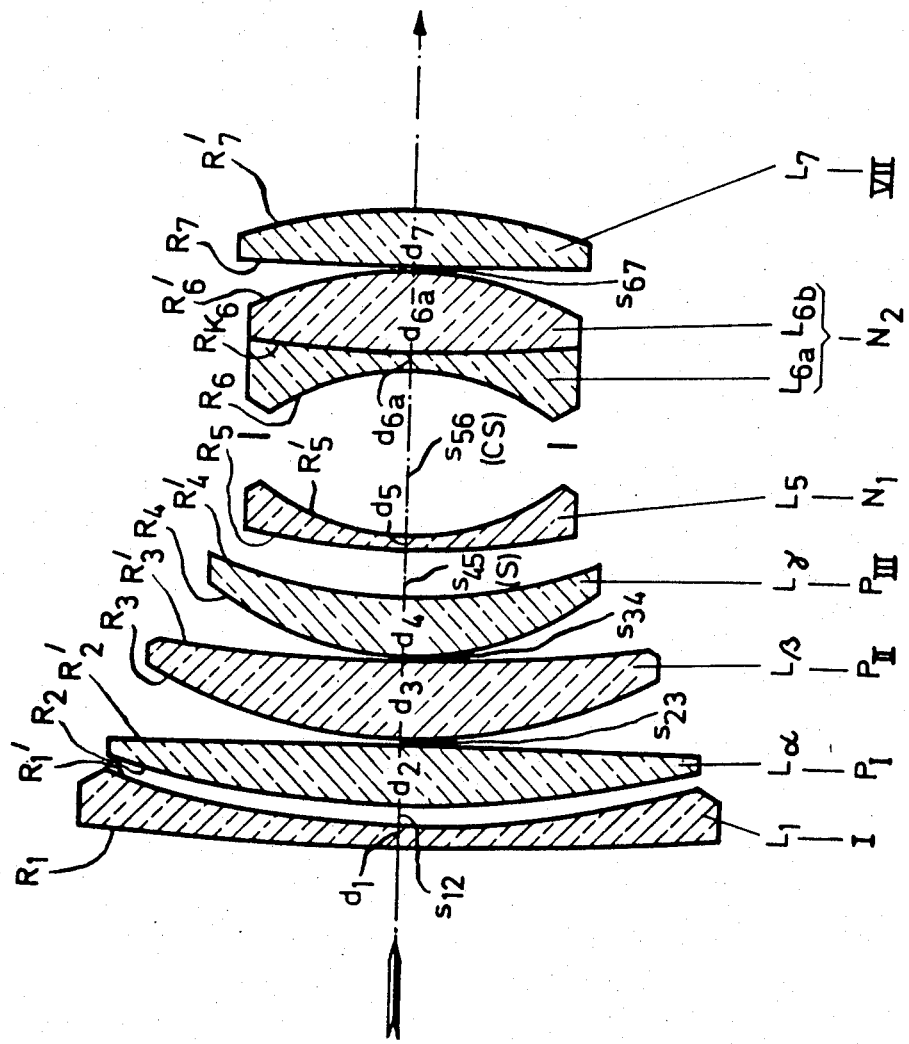
FIGS. 2 through 8 are lens diagrams respectively illustrating other embodiments of the present invention.

For this reason, Ex.2(FIG. 2) makes use of this constructional method, the negative $N_1$ thus taking the form of a thin individual lens and the front component situated on the side of the longer conjugated member and thus facing towards the distant subject consisting of a pair made up of two lenses of opposite intensity sign and separated by an air gap.

Figure 3:
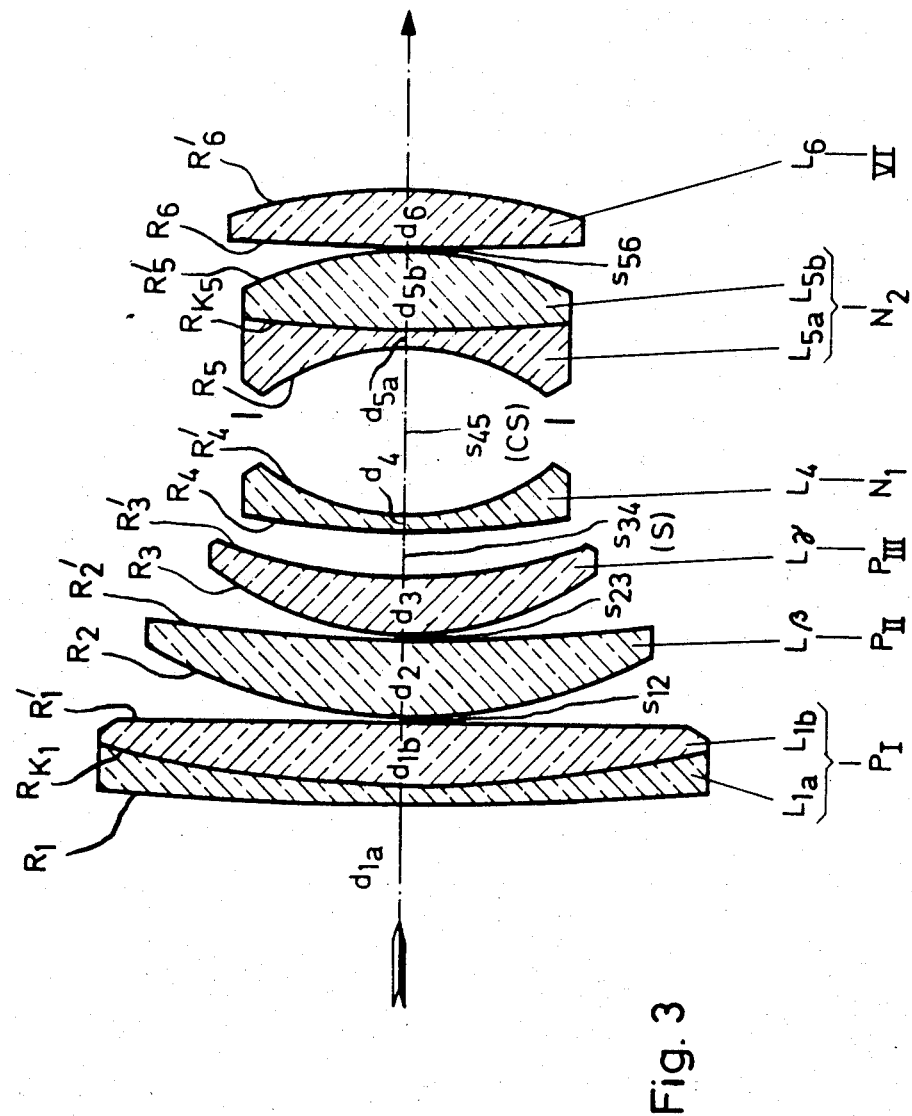

In Ex.3(FIG. 3) this latter constructional method is further simplified by the fact that the front component on the object side has now been converted to one uniform cemented component instead of consisting of two separate elements in contact with air. This two-part front component has been converted from the outer form of a biconvex structural element into that of a meniscal doublet, while the remaining structural elements of the total lens system have been retained without alteration.

Figure 4:
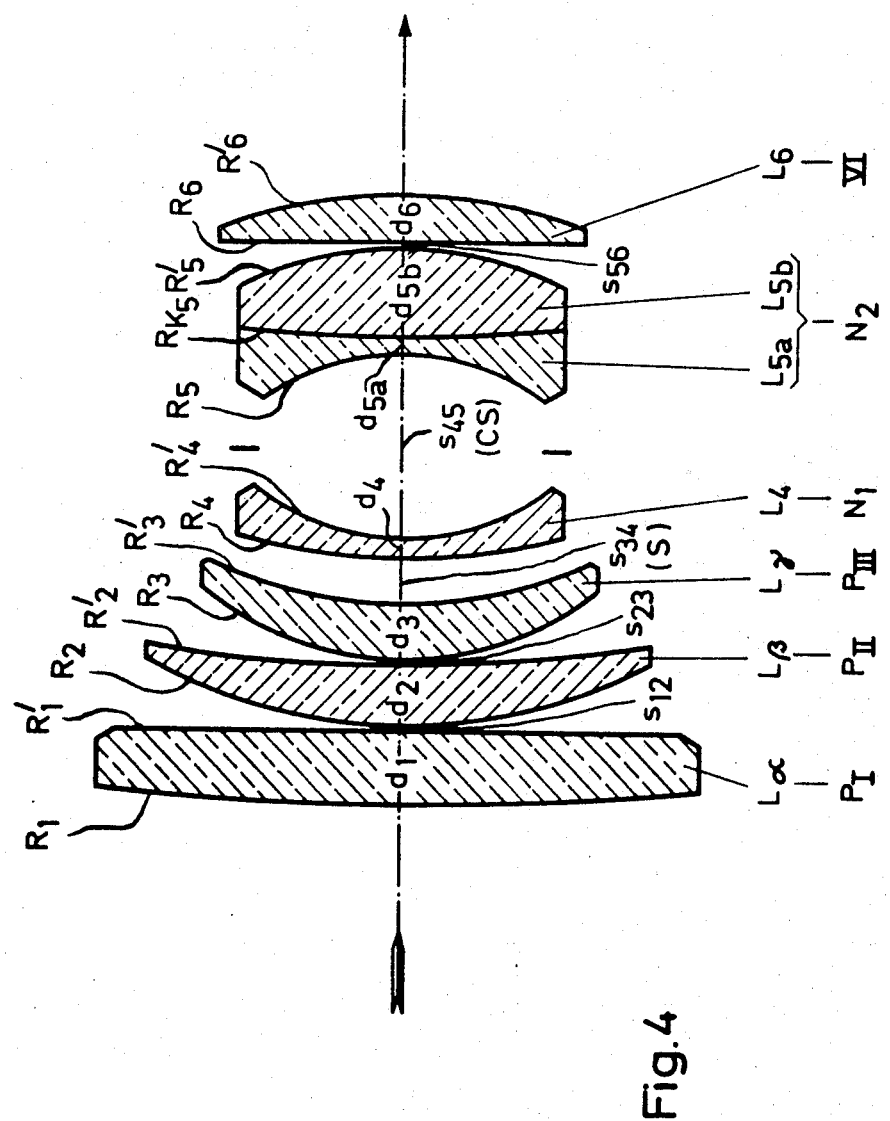
Figure 5:
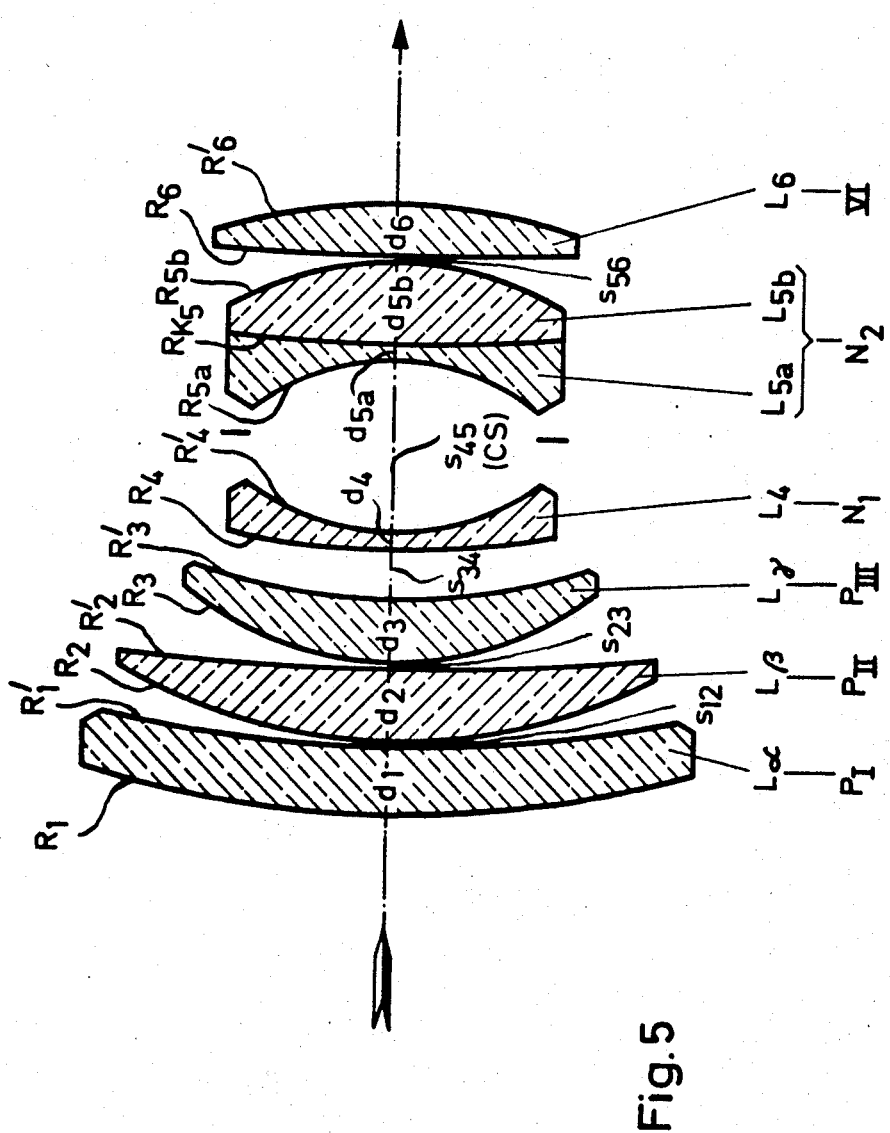
Figure 6:
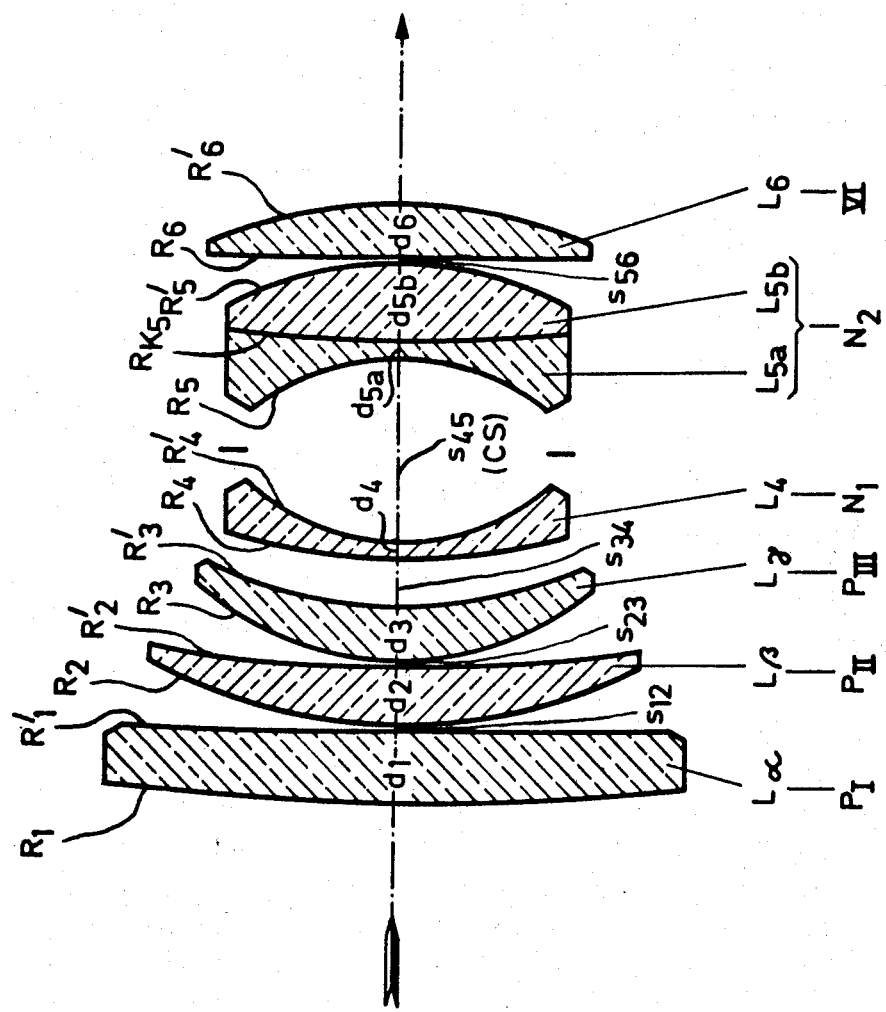
Figure 7:
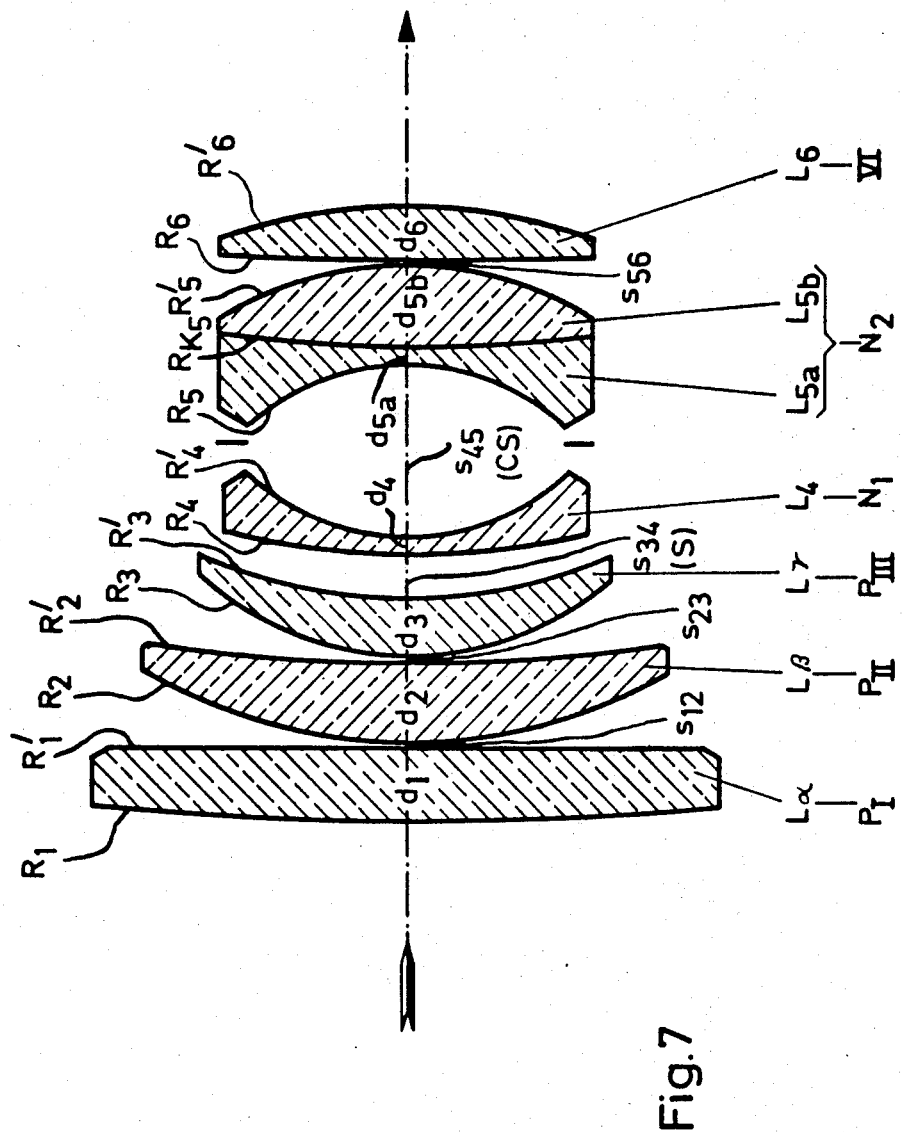
Figure 8:
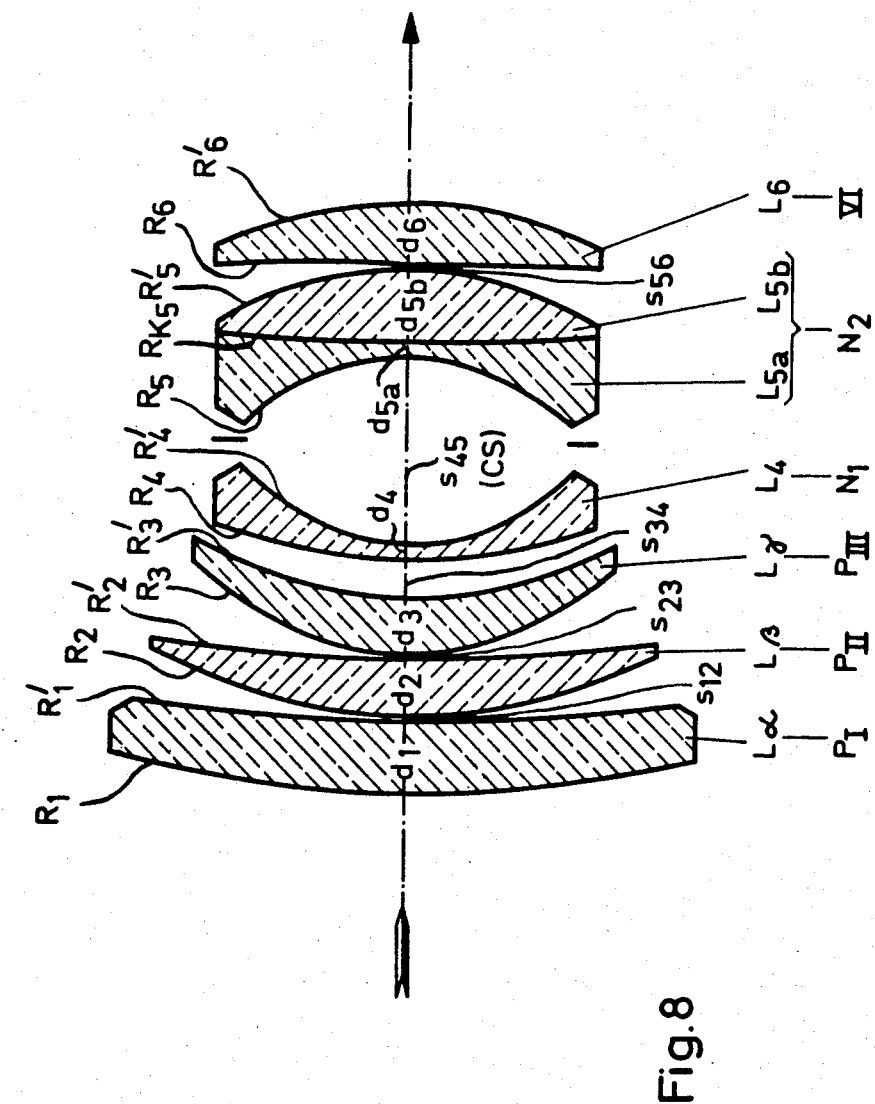

In Ex.4(FIG. 4) the front component $P_I = L_\alpha$ like the rear negative $N_1$ of the front component Vgl is constructed as an individual lens, thus providing the simplest form of the front component of the new lens systems, the dispersive individual lens $N_1$ being preceded by three collecting lenses, each in contact with air, of which the front lens faces, in the image direction, towards the two subsequent meniscal collecting lenses ($P_{II} = L_\beta$ and $P_{III} = L_\gamma$ ) by a plane surface ($R_1' = \infty$) as the rear surface. As a result of this planoconvex construction for the front component delimiting the longer conjugated element, therefore, said front component can be given, in the interests of the most complete possible representation of the image, all three possible constructional forms, i.e., the external construction as a binconvex component, a meniscus which in its outer form is hollow towards the shorter conjugated member, and the planoconvex form representing the inner intermediate case between the said two constructional forms.

The aforementioned examples (1) – (4) are monochromatically precorrected in the SEIDEL range of 3rd order, with accompanying multiple use, for simplification purposes, of radii of curvature, lens thicknesses and glass layers. On the other hand, the subsequent examples, i.e.Exs.(5)–(8), are finely corrected forms of execution, in which the chromatic deviations are at the same time remedied, so that the relevant ABBE numbers ($\nu$ values) likewise are imparted to the glass layers of the individual lenses.

The designations adopted in the diagrams correspond to those given in the tables of data corresponding to the examples. The subsequent tables then summarize and also give detailed proof of the numerical values of the characteristic dimensioning rules, in the same order and based, as before, on $F = 1$.

EXAMPLE 1

(Crude form, precorrected in range of 3d order)

$F = 1.0000 \quad s'_\infty = +0.7114 \quad OAL = 0.7595$

| Component | Lens | Radii | Thicknesses and vertex distances | | Refractive indices |
|---|---|---|---|---|---|
| $P_I$ | $L_\alpha$ | $R_1 = +1.30$ | $d_1 = 0.070$ | | $n_1 = 1.515$ |
| | | $R'_1 = +1.70$ | | $s_{12} = 0.0010$ | |
| $P_{II}$ | $L_\beta$ | $R_2 = +0.70$ | $d_2 = 0.080$ | | $n_2 = 1.700$ |
| | | $R'_2 = +3.00$ | | $s_{23} = 0.0010$ | |
| (Vgl) | | | | | |
| $P_{III}$ | $L_\gamma$ | $R_3 = +0.40$ | $d_3 = 0.070$ | | $n_3 = 1.630$ |
| | | $R'_3 = +0.75$ | | $S = s_{34} = 0.0350$ | |
| $N_1$ | $L_{4a}$ | $R_4 = +1.30$ | $d_{4a} = 0.063$ | | $n_{4a} = 1.770$ |
| | $L_{4b}$ | $R_{K4} = +3.00$ | $d_{4b} = 0.015$ | | $n_{4b} = 1.805$ |
| | | $R'_4 = +0.30$ | | | |
| | | | | $s_{45} = CS = 0.1900$ | |
| $N_2$ | $L_{5a}$ | $R_5 = -0.28$ | $d_{5a} = 0.020$ | | $n_{5a} = 1.630$ |
| | $L_{5b}$ | $R_{K5} = +1.70$ | $d_{5b} = 0.120$ | | $n_{5b} = 1.700$ |
| | | $R'_5 = -0.40$ | | | |
| (Hgl) | | | | $s_{56} = 0.0015$ | |
| VI | $L_6$ | $R_6 = +3.95$ | $d_6 = 0.073$ | | $n_6 = 1.744$ |
| | | $R'_6 = -0.735$ | | | |

EXAMPLE 2

(Crude form, precorrected in range of 3d order)

$F = 1.0000 \quad s'_\infty = +0.7062 \quad OAL = 0.748$

| Component | Lens | Radii | Thicknesses and vertex distances | | Refractive indices |
|---|---|---|---|---|---|
| I | $L_1$ | $R_1 = +4.30$ | $d_1 = 0.015$ | | $n_1 = 1.525$ |
| | | $R'_1 = +2.15$ | | $s_{12} = 0.015$ | |
| $P_I$ | $L_\alpha$ | $R_2 = +2.20$ | $d_2 = 0.099$ | | $n_2 = 1.505$ |
| | | $R'_2 = 190.0$ | | | |
| (Vgl) | | | | $s_{23} = 0.002$ | |
| $P_{II}$ | $L_\beta$ | $R_3 = +0.64$ | $d_3 = 0.095$ | | $n_3 = 1.740$ |
| | | $R'_3 = +2.15$ | | | |
| | | | | $s_{34} = 0.002$ | |
| $P_{III}$ | $L_\gamma$ | $R_4 = +0.38$ | $d_4 = 0.070$ | | $n_4 = 1.615$ |
| | | $R'_4 = +0.64$ | | | |
| | | | | $S = s_{45} = 0.053$ | |
| $N_1$ | $L_5$ | $R_5 = +0.96$ | $d_5 = 0.020$ | | $n_5 = 1.805$ |
| | | $R'_5 = +0.29$ | | | |
| | | | | $s_{56} = CS = 0.190$ | |
| $N_{22}$ | $L_{6a}$ | $R_6 = -0.29$ | $d_{6a} = 0.020$ | | $n_{6a} = 1.600$ |
| | $L_{6b}$ | $R_{K6} = +1.64$ | $d_{6b} = 0.095$ | | $n_{6b} = 1.700$ |
| | | $R'_6 = -0.44$ | | | |
| (Hgl) | | | | $s_{67} = 0.002$ | |
| VII | $L_7$ | $R_7 = +7.00$ | $d_7 = 0.070$ | | $n_7 = 1.740$ |
| | | $R'_7 = 0.67$ | | | |

EXAMPLE 3

(Crude form, precorrected in range of 3d order)

$F = 1.0000 \quad s'_\infty = +0.7063 \quad OAL = 0.704$

| Component | Lens | Radii | Thicknesses and vertex distances | | Refractive indices |
|---|---|---|---|---|---|
| $P_I$ | $L_{1a}$ | $R_1 = +4.30$ | $d_{1a} = 0.015$ | | $n_{1a} = 1.525$ |
| | $L_{1b}$ | $R_{K1} = +2.15$ | $d_{1b} = 0.070$ | | $n_{1b} = 1.505$ |
| | | $R'_1 = +215.0$ | | | |
| | | | | $s_{12} = 0.002$ | |
| $P_{II}$ | $L_\beta$ | $R_2 = +0.64$ | $d_2 = 0.095$ | | $n_2 = 1.740$ |
| | | $R'_2 = +2.15$ | | | |
| (Vgl) | | | | $s_{23} = 0.002$ | |

EXAMPLE—Continued (Crude form, precorrected in range of 3d order)

$F = 1.0000 \quad s'_\infty = +0.7063 \quad OAL = 0.704$

| Component | Lens | Radii | Thicknesses and vertex distances | | Refractive indices |
|---|---|---|---|---|---|
| $P_{III}$ | $L_\gamma$ | $R_3 = +0.38$ | $d_3 = 0.070$ | | $n_3 = 1.615$ |
| | | $R'_3 = +0.64$ | | $S = s_{34} = 0.053$ | |
| $N_1$ | $L_4$ | $R_4 = +0.96$ | $d_4 = 0.020$ | | $n_4 = 1.805$ |
| | | $R'_4 = +0.29$ | | $s_{45} = CS = 0.190$ | |
| | | $R_5 = -0.29$ | | | |
| $N_2$ | $\{L_{5a}$ | $R_{K5} = +1.64$ | $d_{5a} = 0.020$ | | $n_{5a} = 1.600$ |
| | $\{L_{5b}$ | | $d_{5b} = 0.095$ | | $n_{5b} = 1.700$ |
| (Hgl) | | $R'_5 = -0.44$ | | $s_{56} = 0.002$ | |
| VI | $L_6$ | $R_6 = +7.00$ | $d_6 = 0.070$ | | $n_6 = 1.740$ |
| | | $R'_6 = -0.67$ | | | |

EXAMPLE 4

(Crude form, precorrected in range of 3d order)

$R = 1.0000 \quad s'_\infty = +0.7067 \quad OAL = 0.709$

| Component | Lens | Radii | Thicknesses and vertex distances | | Refractive indices |
|---|---|---|---|---|---|
| $P_I$ | $L_\alpha$ | $R_1 = +3.70$ | $d_1 = 0.085$ | | $n_1 = 1.490$ |
| | | $R'_1 = \pm$ plan | | $s_{12} = 0.002$ | |
| $P_{II}$ | $L_\beta$ | $R_2 = +0.65$ | $d_2 = 0.073$ | | $n_2 = 1.745$ |
| | | $R'_2 = +2.00$ | | | |
| (Vgl) | | | | $s_{23} = 0.002$ | |
| $P_{III}$ | $L_\gamma$ | $R_3 = +0.38$ | $d_3 = 0.068$ | | $n_3 = 1.717$ |
| | | $R'_3 = +0.55$ | | $S = s_{34} = 0.055$ | |
| $N_1$ | $L_4$ | $R_4 = +0.75$ | $d_4 = 0.020$ | | $n_4 = 1.805$ |
| | | $R'_4 = +0.28$ | | $s_{45} = CS = 0.215$ | |
| | | $R_5 = -0.29$ | | | |
| $N_2$ | $\{L_{5a}$ | $R_{K5} = +2.00$ | $d_{5a} = 0.020$ | | $n_{5a} = 1.600$ |
| | $\{L_{5b}$ | | $d_{5b} = 0.106$ | | $n_{5b} = 1.700$ |
| (Hgl) | | $R'_5 = -0.44$ | | $s_{56} = 0.001$ | |
| VI | $L_6$ | $R_6 = +144.0$ | $d_6 = 0.062$ | | $n_6 = 1.745$ |
| | | $R'_6 = -0.648$ | | | |

EXAMPLE 5

(Finely corrected execution, relative aperture f/1.95)

$F = 1.00\infty \quad s'_\infty = +0.7098 \quad OAL = 0.710192$

| Component | Lens | Radii | Thicknesses and vertex distances | | Glasses |
|---|---|---|---|---|---|
| $P_I$ | $L_\alpha$ | $R_1 = +1.31010$ | $d_1 = 0.081965$ | | $n_1 = 1.50137/56.40$ |
| | | $R'_1 = +1.67638$ | | $s_{12} = 0.001039$ | |
| $P_{II}$ | $L_\beta$ | $R_2 = +0.68748$ | $d_2 = 0.089236$ | | $n_2 = 1.69350/53.35$ |
| | | $R'_2 = +3.15909$ | | | |
| (Vgl) | | | | $s_{23} = 0.001000$ | |
| $P_{III}$ | $L_\gamma$ | $R_3 = +0.40930$ | $d_3 = 0.078598$ | | $n_3 = 1.62606/38.96$ |
| | | $R'_3 = +0.74605$ | | $(S) = s_{34} = 0.057900$ | |
| $N_1$ | $L_4$ | $R_4 = +1.11784$ | $d_4 = 0.020082$ | | $n_4 = 1.80518/25.43$ |
| | | $R'_4 = +0.29955$ | | $s_{45} = CS = 0.198535$ | |
| | | $R_5 = -0.28139$ | | | |
| $N_2$ | $\{L_{5a}$ | $R_{K5} = +1.91981$ | $d_{5a} = 0.0119274$ | | $n_{5a} = 1.60140/38.23$ |
| | $\{L_{5b}$ | | $d_{5b} = 0.097911$ | | $n_{5b} = 1.69680/55.43$ |
| (Hgl) | | $R'_5 = -0.40228$ | | $s_{56} = 0.001539$ | |
| VI | $L_6$ | $R_6 = +4.22560$ | $d_6 = 0.063113$ | | $n_6 = 1.74400/41.77$ |
| | | $R'_6 = -0.73871$ | | | |

EXAMPLE 6

(Finely corrected execution, relative aperture f/1.90)

$F = 1.0000 \quad s'_\infty = +0.7090 \quad OAL = 0.6965$

| Component | Lens | Radii | Thicknesses and vertex distances | | Glasses |
|---|---|---|---|---|---|
| $P_I$ | $L_\alpha$ | $R_1 = +2.79966$ | $d_1 = 0.084348$ | | $n_1 = 1.50137/56.40$ |
| | | $R'_1 = +10.6746$ | | $s_{12} = 0.00173$ | |
| $P_{II}$ | $L_\beta$ | $R_2 = +0.64507$ | $d_2 = 0.073949$ | | $n_2 = 1.74400/44.77$ |
| | | $R'_2 = +1.91195$ | | $s_{23} = 0.001733$ | |
| (Vgl) $P_{III}$ | $L_\gamma$ | $R_3 = +0.37876$ | $d_3 = 0.067786$ | | $n_3 = 1.71700/47.99$ |
| | | $R'_3 = +0.54666$ | | $(S) = s_{34} = 0.056232$ | |
| $N_1$ | $L_4$ | $R_4 = +0.74490$ | $d_4 = 0.019835$ | | $n_4 = 1.80518/25.43$ |
| | | $R'_4 = +0.27596$ | | $s_{45} = CS = 0.212938$ | |
| $N_2$ | $L_{5a}$ | $R_5 = -0.29021$ | $d_{5a} = 0.020220$ | | $n_{5a} = 1.60565/37.83$ |
| | | $R_{K5} = +2.22386$ | | | |
| | $L_{5b}$ | $R'_5 = -0.44054$ | $d_{5b} = 0.091281$ | | $n_{5b} = 1.69680/55.43$ |
| (Hgl) | | | | $s_{56} = 0.001155$ | |
| VI | $L_6$ | $R_6 = +192.575$ | $d_6 = 0.065283$ | | $n_6 = 1.74400/44.77$ |
| | | $R'_6 = -0.60028$ | | | |

EXAMPLE 7

(Finely corrected execution, relative aperture f/1.80)

$F = 1.0000 \quad s'_\infty = +0.7089 \quad OAL = 0.7188$

| Component | Lens | Radii | Thicknesses and vertex distances | | Glasses |
|---|---|---|---|---|---|
| $P_I$ | $L_\alpha$ | $R_1 = +4.23833$ | $d_1 = 0.085188$ | | $n_1 = 1.50137/56.40$ |
| | | $R'_1 = +246.661$ | | $s_{12} = 0.001747$ | |
| $P_{II}$ | $L_\beta$ | $R_2 = +0.63831$ | $d_2 = 0.097111$ | | $n_2 = 1.73520/41.58$ |
| | | $R'_2 = +2.14858$ | | $s_{23} = 0.002746$ | |
| (Vgl) $P_{III}$ | $L_\gamma$ | $R_3 = +0.37976$ | $d_3 = 0.072343$ | | $n_3 = 1.61484/51.15$ |
| | | $R'_3 = +0.63047$ | | $S_3 = s_{34} = 0.049630$ | |
| $N_1$ | $L_4$ | $R_4 = +0.95863$ | $d_4 = 0.019948$ | | $n_4 = 1.80518/254.3$ |
| | | $R'_4 = +0.28842$ | | $s_{45} = CS = 0.198388$ | |
| $N_2$ | $L_{5a}$ | $R_5 = -0.29357$ | $d_{5a} = 0.020755$ | | $n_{5a} = 1.59551/39.18$ |
| | | $R_{K5} = +1.62057$ | | | |
| | $L_{5b}$ | $R'_5 = -0.44038$ | $d_{5b} = 0.097917$ | | $n_{5b} = 1.69680/55.43$ |
| (Hgl) | | | | $s_{56} = 0.001670$ | |
| VI | $L_6$ | $R_6 = +7.86312$ | $d_6 = 0.063339$ | | $n_6 = 1.74400/44.77$ |
| | | $R'_6 = -0.67627$ | | | |

$OAL = 0.710782$

EXAMPLE 8

| Component | Lens | Radii | Thicknesses and vertex distances | | Glasses |
|---|---|---|---|---|---|
| $P_I$ | $L_\alpha$ | $R_1 = +1.42316$ | $d_1 = 0.063735$ | | $n_1 = 1.50437/56.40$ |
| | | $R'_1 = +2.28388$ | | $s_{12} = 0.001339$ | |
| $P_{II}$ | $L_\beta$ | $R_2 = +0.63772$ | $d_2 = 0.071489$ | | $n_2 = 1.73520/41.58$ |
| | | $R'_2 = +2.03910$ | | $s_{23} = 0.000957$ | |
| (Vgl) $P_{III}$ | $L_\gamma$ | $R_3 = +0.35615$ | $d_3 = 0.068350$ | | $n_3 = 1.72000//50.42$ |
| | | $R'_3 = +0.50319$ | | $(S) = s_{34} = 0.044221$ | |
| $N_1$ | $L_4$ | $R_4 = +0.69137$ | $d_4 = 0.019039$ | | $n_4 = 1.80518/25.43$ |
| | | $R'_4 = +0.26361$ | | $s_{45} = CS = 0.212457$ | |
| $N_2$ | $L_{5a}$ | $R_5 = -0.28612$ | $d_{5a} = 0.019269$ | | $n_{5a} = 1.61293/37.04$ |
| | | $R_{K5} = +3.21051$ | | | |
| | $L_{5b}$ | $R'_5 = -0.44300$ | $d_{5b} = 0.085783$ | | $n_{5b} = 1.69680/55.43$ |
| (Hgl) | | | | $s_{56} = 0.001129$ | |
| VI | $L_6$ | $R_6 = -15.4433$ | $d_6 = 0.070953$ | | $n_6 = 1.74400/44.77$ |
| | | $R'_6 = -0.54996$ | | | |

In the foregoing tables of data, the lenses, their thicknesses and the refraction indices of their glasses as viewed in the direction of the light from the side of the longer conjugated member to the shorter conjugated member are defined, for the structural components taking the form of cemented doublets, and with the additional index letter (a) and (b) for the separate lens occupying the first position and for that occupying the second position, respectively, in this direction, while the internal cemented surface is in each case designated as $R_K$.

While Ex.2 is made up of seven structural components in contact with air, the remaining examples, in order to ensure as compact a structure as possible, have been made up of only six components in contact with air, special preference having been given to the version in which the total lens system is made up of a total of seven separate lenses of which two, as a cemented doublet, delimit the large inner air space in the direction of the image.

As may be seen from the heading to Ex.(5)–(8), the relative aperture of these finely corrected forms of execution has been considerably increased by comparison to the crude forms. To render the comparison easier, the front lenses for the finely corrected Ex.5, 6 and 7 are made of one uniform type of glass. Furthermore, in all four finely corrected forms the types of glass for the lenses $L_4$, $L_{5b}$ and $L_6$ are uniform for the said lenses, for didactic reasons. Again, it may be seen from a comparison of Ex.1 with Ex.5,
of Ex.3 with Ex.7 and
of Ex.4 with Ex.6 that the dioptrically particularly effective structural elements of the finely corrected forms of execution only differ comparatively slightly from those of the crude forms pre-corrected in the SEIDEL range of the 3rd order, so that thanks to the technical utilization of the new combination of constructional rules according to the invention the way is already opened up, in the preliminary forms, for technical progress, in conjunction with a very compact construction and ample relative apertures.

To simplify the comparison still further, the refraction indices of the glasses for the d-line of the helium spectrum with the wave length $\lambda_d = 5876$ A units have been used throughout, and in the finely corrected forms these refraction indices have been supplemented by the $\nu_d$ values (separated by an oblique stroke) serving to characterize the type of glass used, since these lens systems are intended for colour photography with the usual commercial colour emulsions.

The following tables summarize the numerical values for the characteristics of the present invention, while, like the details in the tables of data, are referred to the equivalent focal length $F = 1$ and accordingly to the equivalent refraction power $\Phi = 1$. For all lens focal lengths deviating from this common unit, all numerical values are to be converted to the latter in the known manner and in accordance with the routine procedure adopted, for purposes of comparison, by designers of optical apparatus. The examples indicate the range limits of the new dimensioning rules according to the invention, in the usual tolerance range of ±10 percent, while Table IV in the following tables indicates, in addition, which of the claims covers each particular version of the present invention.

Table I

To fulfill characteristic (a)

| Example | $\phi_\beta + \phi_\gamma$ |
|---|---|
| 1 | + 1.50167 $\Phi$ |
| 2 | + 1.46955 $\Phi$ |
| 3 | + 1.46955 $\Phi$ |
| 4 | + 1.35686 $\Phi$ |
| 5 | + 1.47964 $\Phi$ |
| 6 | + 1.34567 $\Phi$ |
| 7 | + 1.45343 $\Phi$ |
| 8 | + 1.38307 $\Phi$ |

Table II

To fulfill characteristic (b)

| Example | $\rho_\beta - \rho_\alpha = \Delta_{\alpha,\beta}$ | $\rho_\gamma - \rho_\beta = \Delta_{\beta,\gamma}$ | $\rho_\gamma - \rho_{N1} = \Delta(S)$ |
|---|---|---|---|
| 1 | 0.65934 | 1.07143 | 0.56410 |
| 2 | 1.10795 | 1.06908 | 0.52083 |
| 3 | 1.32994 | 1.06908 | 0.52083 |
| 4 | 1.26819 | 1.09312 | 0.48485 |
| 5 | 0.69130 | 0.98857 | 0.44582 |
| 6 | 1.19303 | 1.08999 | 0.48682 |
| 7 | 1.33076 | 1.06661 | 0.54297 |
| 8 | 0.86843 | 1.23975 | 0.54094 |
| Characteristic | ($b_1$) | ($b_2$) | ($b_3$) |

TABLE III

For fulfillment of characteristics (c) and (d)

| Example | $-\Phi_\gamma'$ | $-(\Phi_\beta' + \Phi_\gamma')$ | $-Q_{(\beta,\gamma)}$ |
|---|---|---|---|
| 1 | 0.84000 $\Phi$ | 1.07333 $\Phi$ | 1.39910 |
| 2 | 0.96094 $\Phi$ | 1.30512 $\Phi$ | 1.12599 |
| 3 | 0.96094 $\Phi$ | 1.30512 $\Phi$ | 1.12599 |
| 4 | 1.30364 $\Phi$ | 1.67614 $\Phi$ | 0.80951 |
| 5 | 0.83917 $\Phi$ | 1.05870 $\Phi$ | 1.39760 |
| 6 | 1.31159 $\Phi$ | 1.70072 $\Phi$ | 0.79124 |
| 7 | 0.97521 $\Phi$ | 1.31739 $\Phi$ | 1.10326 |
| 8 | 1.43088 $\Phi$ | 1.79143 $\Phi$ | 0.77205 |
| Characteristic | ($c_1$) | ($c_2$) | (d) |

Table IV

For fulfillment of characteristic (e) of subsidiary claims

| Example | $-(\Phi_\gamma : \phi_\gamma')$ |
|---|---|
| 1 | 0.87500 |
| 2 | 0.68421 |
| 3 | 0.68421 |
| 4 | 0.44737 |
| 5 | 0.82272 |
| 6 | 0.44331 |
| 7 | 0.66019 |
| 8 | 0.41286 |
| Characteristic | (e) |

The examples given for the present invention are also built up in such a manner as to indicate clearly to the designer of optical equipment following them that, contrary to the frequently adopted method of building up high light intensity GAUSS modifications according to existing prior art, the collecting lens which in the front component V$gl$ precedes the negative $N_1$, with the inclusion of an air gap, in the direction towards the longer conjugated member, i.e., on the object side, need not necessarily consist of a glass of which the refraction index position is equal to or greater than the refraction index referred to the same wave length — or, in the case of a compound set of lenses, to the average refraction index — of the said negative $N_1$, and that the considerable technical advance provided by the invention is also obtainable when, in the lens system to which it relates, the said collecting lens $L_\gamma$ is provided by means of a simple baryta crown glass which has a far lower refraction index than that of the negative $N_1$ by which the front component $V_{gl}$ is sealed off in the direction of the large inner air gap CS. Surprisingly enough, the technical advance at which the invention aims is also obtainable when the refraction index difference in the air lens enclosed between the aforementioned collecting lens $L_\gamma$ and the negative $N_1$ is still below −0.15.

FOR EXAMPLE 1 (DATA TABLE 1)

| Radius | S I | S II | S III | S IV | S V | PETZV |
|---|---|---|---|---|---|---|
| 1 .1021 | .0771 | .4363 | .3198 | .2415 | .2615 | |
| 2 −0.0166 | −0.0271 | −0.3324 | −0.2441 | −0.3980 | −0.2000 | |
| 3 .4588 | .1308 | .7001 | .6255 | .1783 | .5882 | |
| 4 .1393 | −0.3325 | 2.2452 | .6569 | −1.5687 | −0.1373 | |
| 5 .0257 | .0075 | .9728 | .9685 | .2827 | .9663 | |
| 6 .1720 | −0.4622 | 3.2108 | .7267 | −1.9529 | −0.5113 | |
| 7 −0.7999 | 1.2657 | −5.6741 | −1.6683 | 2.6399 | .3346 | |
| 8 −0.0453 | −.0509 | −0.1675 | −0.0534 | .0599 | .0037 | |
| 9 −1.0220 | −0.4940 | −2.2029 | −1.7254 | −0.08339 | −1.4866 | |
| 10 −2.8032 | 1.2266 | −2.9907 | −1.9171 | .8389 | −1.3804 | |
| 11 0.885 | .0975 | .3372 | .1223 | .1348 | .0149 | |
| 12 1.4461 | −0.4897 | 1.5200 | 1.2930 | −0.3984 | 1.0294 | |
| 13 −0.0001 | −0.0021 | −0.1110 | .0350 | 1.2427 | .1080 | |
| 14 2.5013 | −0.6398 | 1.0715 | .7441 | −0.1903 | .5804 | |
| Sum:.2667 | .4088 | −0.9848 | −0.2166 | .2764 | .1674 | |

Radius 8 = pair of cemented surfaces in negative $N_1$.
Radius 11 = pair of cemented surfaces in negative $N_2$

FOR EXAMPLE 2 (DATA TABLE 2)

| Radius | S I | S II | S III | S IV | S V | PETZV |
|---|---|---|---|---|---|---|
| 1 .0028 | .0106 | .1998 | .1200 | .4498 | .0801 | |
| 2 −0.0599 | −0.0698 | −0.4045 | −0.2416 | −0.2818 | −0.1601 | |
| 3 .0564 | .0681 | .3990 | .2347 | .2833 | .1525 | |
| 4 .0008 | −0.0077 | .2123 | .0719 | −0.6586 | .0018 | |
| 5 .6302 | .1516 | .7740 | .7010 | .1687 | .6645 | |
| 6 .1266 | −0.3186 | 2.2068 | .6037 | −1.5188 | −0.1978 | |
| 7 −0.0155 | −0.0051 | .9970 | 1.0004 | .3328 | 1.0021 | |
| 8 .0809 | −0.2936 | 2.6007 | .4702 | −1.7059 | −0.5950 | |
| 9 −0.5504 | .9860 | −4.8350 | −1.3019 | 2.3325 | .4646 | |
| 10 −1.2399 | −0.5449 | −2.2562 | −1.7773 | −0.7811 | −1.5379 | |
| 11 −2.9453 | 1.2402 | −2.8599 | −1.8154 | .7644 | −1.2931 | |
| 12 .1115 | .1250 | .4430 | .1626 | .1823 | .0224 | |
| 13 1.0944 | −0.4962 | 1.6107 | 1.1608 | −0.5263 | .9358 | |
| 14 −0.0001 | .0030 | −0.2341 | −0.0375 | 1.2291 | .0608 | |
| 15 2.7629 | −0.7445 | 1.2366 | .8354 | −0.2251 | .6348 | |
| Sum:.0557 | .1042 | .0900 | .1869 | .0454 | .2354 | |

Radius 12 = pair of cemented surfaces in negative $N_2$.

FOR EXAMPLE 3 TABLE 3)

| Radius | S I | S II | S III | S IV | S V | PETZV |
|---|---|---|---|---|---|---|
| 1 .0028 | .0107 | .2020 | .1207 | .4567 | .0801 | |
| 2 −0.0009 | −0.0011 | −0.0081 | −0.0054 | −0.0065 | −0.0041 | |
| 3 .0007 | −0.0067 | .1998 | .0655 | −0.6534 | −0.0016 | |
| 4 .6305 | .1517 | .7740 | .7010 | .1686 | .6645 | |
| 5 .1266 | −0.3185 | 2.2065 | .6036 | −1.5186 | −0.1978 | |
| 6 −0.0154 | −0.0051 | .9970 | 1.0004 | .3328 | 1.0021 | |
| 7 .0809 | −0.2936 | 2.6003 | .4701 | −1.7057 | −0.5950 | |
| 8 −0.5503 | .9859 | −4.8345 | −1.3018 | 2.3322 | .4646 | |
| 9 −1.2404 | −0.5450 | −2.2564 | −1.7774 | −0.7810 | −1.5379 | |
| 10 −2.9457 | 1.2403 | −2.5898 | −1.8154 | .7644 | −1.2931 | |
| 11 .1115 | .1250 | .4430 | .1626 | .1823 | .0224 | |
| 12 1.0945 | −0.4962 | 1.6106 | 1.1608 | −0.5272 | .9359 | |
| 13 −0.0001 | .0030 | −0.2339 | −0.0375 | 1.2290 | .0608 | |
| 14 2.7634 | −0.7446 | 1.2366 | .8354 | −0.2251 | .6348 | |
| Sum:.0582 | .1058 | .0772 | .1828 | .0496 | .2356 | |

Radius 2 = pair of cemented surfaces in front component $P_l$.
11 = pair of cemented surfaces in negative $N_2$

FOR EXAMPLE 4 (DATA TABLE 4)

| Radius | S I | S II | S III | S IV | S V | PETZV |
|---|---|---|---|---|---|---|
| 1 .0044 | .0140 | .2243 | .1340 | .4314 | .0889 | |
| 2 .0013 | −0.0102 | .2452 | .0817 | −0.6565 | 0 | |
| 3 .5486 | .1653 | .8063 | .7067 | .2129 | .6569 | |
| 4 .0958 | −0.2625 | 1.9458 | .5063 | −1.3880 | −0.2135 | |
| 5 −0.0179 | −0.0056 | 1.0936 | 1.0972 | .3460 | 1.0990 | |
| 6 .0052 | −0.0674 | 1.8738 | .1184 | −1.5429 | −0.7593 | |
| 7 −0.2440 | .5912 | −3.7038 | −0.8381 | 2.0312 | .5947 | |
| 8 −1.3784 | −0.5758 | −2.3144 | −1.8334 | −0.7658 | −1.5929 | |
| 9 −3.0586 | 1.0854 | −2.4487 | −1.6783 | .5956 | −1.2932 | |
| 10 .0821 | .1065 | .4333 | .1567 | .2034 | .0184 | |
| 11 1.1933 | −0.4279 | 1.3963 | 1.0894 | −0.3907 | .9359 | |
| 12 −0.0028 | .0207 | −0.4576 | −0.1506 | 1.1167 | .0030 | |
| 13 2.8983 | −0.5415 | .9624 | .7601 | −0.1420 | 6589 | |
| Sum:.1272 | .0922 | .0567 | .1500 | .0515 | .1967 | |

Radius 10 = pair of cemented surfaces in negative $N_2$.

FOR EXAMPLE 5 (DATA TABLE 5)

| Radius | S I | S II | S III | S IV | S V | PETZV |
|---|---|---|---|---|---|---|
| 1 .0989 | .0759 | .4297 | .3131 | .2403 | .2549 | |
| 2 −0.0191 | −0.0302 | −0.3423 | −0.2469 | −0.3900 | −0.1992 | |
| 3 .4981 | .1393 | .7126 | .6346 | .1775 | .5957 | |
| 4 .1565 | −0.3580 | 2.3271 | .6893 | −1.5765 | −0.1296 | |
| 5 −0.0193 | −0.0070 | .9331 | .9381 | .3400 | .9407 | |
| 6 .1602 | −0.4403 | 3.1133 | .6937 | −1.9062 | −0.5161 | |
| 7 −0.6324 | 1.0819 | −5.1535 | −1.4518 | 2.4837 | .3990 | |
| 8 −1.1737 | −0.5372 | −2.2265 | −1.7349 | −0.7940 | −1.4890 | |
| 9 −2.8811 | 1.1715 | −2.7056 | −1.8109 | .7364 | −1.3346 | |
| 10 .1086 | .1241 | .4437 | .1601 | .1830 | .0183 | |
| 11 1.4688 | −0.5258 | 1.5854 | 1.2090 | −0.4328 | 1.0208 | |
| 12 −0.0000 | −0.0008 | −0.1697 | .0107 | 1.2339 | .1010 | |
| 13 2.4735 | −0.1784 | 1.2034 | .7861 | −0.2283 | .5775 | |
| Sum:.2391 | −0.0249 | .0926 | .1904 | .0669 | .2393 | |

Radius 10 = pair of cemented surfaces in negative $N_2$.

FOR EXAMPLE 6 (DATA TABLE 6)

| Radius | S I | S II | S III | S IV | S V | PETZV |
|---|---|---|---|---|---|---|
| 1 .0101 | .0235 | .2823 | .1736 | .4019 | .1193 | |
| 2 .0001 | −0.0022 | .1352 | .0242 | −0.6244 | −0.0313 | |
| 3 .5568 | .1641 | .8065 | .7097 | .2092 | .6614 | |
| 4 .0813 | −0.2375 | 1.8580 | .4706 | −1.3747 | −0.2231 | |
| 5 −0.0034 | −0.0011 | 1.1016 | 1.1022 | .3412 | 1.1026 | |
| 6 .0033 | −0.0533 | 1.8144 | .0955 | −1.5398 | −0.7639 | |
| 7 −0.2282 | .5686 | −3.6510 | −0.8178 | 2.0376 | .5988 | |
| 8 −1.5523 | −0.6261 | −2.3740 | −1.8689 | −0.7538 | −1.6164 | |
| 9 −2.9722 | 1.0749 | −2.4660 | −1.6885 | .6107 | −1.2998 | |
| 10 .0778 | 0.995 | .3968 | .1423 | .1821 | .0150 | |
| 11 1.0216 | −0.4194 | 1.4532 | 1.1059 | −0.4580 | .9322 | |
| 12 −0.0007 | .0087 | −0.3071 | −0.1009 | 1.1930 | .0022 | |
| 13 3.2393 | −0.5784 | 1.0205 | .8140 | −0.1453 | .7107 | |
| Sum .2245 | .0214 | .0704 | .1619 | .0796 | .2077 | |

Radius 10: pair of cemented surfaces in negative $N_2$.

FOR EXAMPLE 7 (DATA TABLE 7)

| Radius | S I | S II | S III | S IV | S V | PETZV |
|---|---|---|---|---|---|---|
| 1 .0029 | .0109 | .2002 | .1193 | .4439 | .0788 | |
| 2 .0008 | −0.0075 | .2116 | .0696 | −0.6564 | −0.0014 | |
| 3 .6220 | .1505 | .7731 | .7002 | .1695 | .6638 | |
| 4 .1287 | −0.3219 | 2.2178 | .6078 | −1.5202 | −0.1972 | |
| 5 −0.0223 | −0.0076 | .9948 | 1.0000 | .3422 | 1.0026 | |
| 6 .0733 | −0.2776 | 2.5521 | .4481 | −1.6980 | −0.6039 | |
| 7 −0.5397 | .9733 | −4.8003 | −1.2899 | 2.3262 | .4653 | |
| 8 −1.3171 | −0.5683 | −2.2821 | −1.7917 | −0.7731 | −1.5465 | |
| 9 −2.7805 | 1.1464 | −2.6894 | −1.7440 | .7191 | −1.2714 | |
| 10 .1127 | .1288 | .4645 | .1702 | .1945 | .0231 | |
| 11 1.1222 | −0.4751 | 1.5358 | 1.1336 | −0.4799 | .9325 | |
| 12 −0.0002 | .0048 | −0.2697 | −0.0537 | 1.2063 | .0543 | |
| 13 2.7587 | −0.7014 | 1.1659 | .8092 | −0.2057 | .6308 | |
| Sum:.1615 | .0552 | .0743 | .1786 | .0684 | .2308 | |

Radius 10 = pair of cemented surfaces in negative $N_2$.

FOR EXAMPLE 8 (DATA TABLE 8)

| Radius | S I | S II | S III | S IV | S V | PETZV |
|---|---|---|---|---|---|---|
| 1 .0772 | .0722 | .4371 | .3021 | .2825 | .2347 | |
| 2 −0.0016 | −0.0049 | −0.1914 | −0.1613 | −0.4935 | −0.1462 | |
| 3 .5451 | .1630 | .8160 | .7131 | .2132 | .2132 | |
| 4 .1082 | −0.2859 | 2.0580 | .5475 | −1.4463 | −0.2078 | |
| 5 .0420 | .0110 | 1.1841 | 1.1783 | .3090 | 1.1754 | |
| 6 .0002 | −0.0132 | .0242 | .0242 | −1.5654 | −0.8319 | |
| 7 −0.2066 | .5455 | −3.6744 | −0.7947 | 2.0977 | .6452 | |
| 8 −1.8713 | −0.6415 | −2.3519 | −1.9120 | −0.6555 | −1.6921 | |
| 9 −3.1682 | 1.1944 | −2.6790 | −1.7785 | .6705 | −1.3282 | |
| 10 .0602 | .0794 | .3235 | .1142 | .1506 | .0095 | |
| 11 .8838 | −0.4215 | 1.5300 | 1.1280 | −0.5379 | .9270 | |
| 12 −0.0005 | .0063 | −0.2532 | −0.1028 | 1.2183 | −0.0276 | |
| 13 3.7329 | −0.6508 | 1.1161 | .8892 | −0.1550 | .7757 | |
| Sum:.2012 | .0539 | .0458 | .1473 | .0881 | .1981 | |

Radius 10 = pair of cemented surfaces in negative $N_2$.

What is claimed is:

1. High light intensity lens of the extended GAUSS type, consisting of at least six structural elements in contact with air, of which at least four belong to the front component situated on the object side and facing towards the longer conjugated member, followed by a GAUSS half forming the rear component on the image side and mainly built up in the normal standard manner, enclosing between them a highly dispersive biconvex central vertex gap CS in such a way that the outer surfaces belonging to the two inner negative components and in contact with air are concave towards the said air gap, in addition to which at least one of these two negative menisci is made up of at least two individual lenses, while to ensure the maximum possible width of cut on the image side the negative meniscus $N_2$ will be followed solely by one unequal-sided collecting element, as viewed in the direction of the shorter conjugated member, while the other negative $N_1$ is preceded, as viewed in the direction of the object side, by at least three predominantly separate structural elements which are exposed to the air, characterized by the following dimensioning combination:

a. the lens components which, as viewed in the direction of the longer conjugated member, precede the negative $N_1$ situated on the side of the inner biconvex air space CS, contain at least two menisci ($P_{II} = L_\beta$ and $P_{III} = L_\gamma$), in each case delimited on both sides by an air space, and of positive refraction power, the sum of the surface refractive powers ($\phi_\beta + \phi_\beta' + \phi_\gamma + \phi_\gamma' + \phi_\gamma$) of these two positive menisci being greater than 1.23 times the equivalent refraction power $\Phi$ of the total lens system but less than 1.65 $\Phi$ these two positive menisci being preceded, as viewed in the direction of the object space(longer conjugated member), by at least one third positive component($P_I = L_\alpha$), while at the same time b. the third collecting structural element ($P_I = L_\alpha$), which precedes the said two positive menisci on the object side, and which, as viewed in the direction of the light, from the object side, constitutes the front structural element, is provided, like each of the two subsequent positive menisci ($P_{II} = L_\beta$ and $P_{III} = L_\gamma$) with one surface with a convexity towards the longer conjugated member, these three surfaces having among themselves a progressively increased curvature from the side of the longer to the shorter conjugated member (the reciprocal lengths of radii thus being $\rho = 1 : R$), while the curvature difference ($\Delta_{\alpha,\beta}$) between the front surfaces of the collecting lenses on the object side and of the inner positive meniscus, based on the equivalent refraction power $\Phi = 1$ (as the reference unit), is selected between a lower position range limit of 0.600 on the one hand and an upper limit of 1.475 on the other, and the curvature difference ($\Delta_{\beta,\gamma}$) (likewise based on $\Phi = 1$) between the front surface of the inner positive meniscus and that of the last collecting front-component meniscus, which is the subsequent one as viewed in the direction of the light to the first negative $N_1$, between a lower position range limit of 0.900 on the one hand and an upper limit of 1.350 on the other, in addition to which the space S preceding the said negative $N_1$, to the added third positive ($P_{III} = L_\gamma$), is given the meniscal shape required to ensure that the limiting surfaces enclosing the said space, will be given a curvature difference ($\Delta_{1S}$) — based on the equivalent focal length $F = 1$ and thus on the equivalent refraction power $\Phi = 1$ — of which the absolute values are less than 0.625, but without falling below the minimum value of 0.410, while, in addition, c. the positive meniscus ($P_{III} = L_\gamma$) directly preceding the negative $N_1$ is so constructed that its hollow surface, which delimits the finite air space S enclosed in the direction of the subsequent negative $N_1$, and which in respect of the direction of the light constitutes the rear surface, has a considerable dispersion effect, of which the surface refraction power ($\phi_\gamma'$) is greater than 0.765 $\Phi$, but without exceeding the value of $-1.580$ $\Phi$, while at the same time the positive meniscus ($P_{II} = L_\beta$) *which precedes this meniscal collecting lens ($L_\gamma$)* in the direction of the longer conjugated member, in a finite air gap, likewise has a dispersive concave rear surface which is given the dimensions required to ensure that its surface refraction power ($\phi_\beta'$) combined with the aforementioned dispersive surface refraction power ($\phi_\gamma'$), i.e. the sum ($\phi_\beta' + \phi_\gamma'$) of the refraction powers, is greater than $-0.975$ $\Phi$, but without exceeding the value $-1.950$ $\Phi$, wherein, in accordance with scientific practice, the symbol $\phi$ is adopted for the equivalent refraction power of the total lens system and the surface refraction powers of the individual lens surfaces are expressed as $\phi = (n'-n)nR = (n'-n)\rho$ and the lens refraction powers as $\phi$ (as the sum of the surface refraction powers $\phi + \phi'$ in the direction of the light for the front and for the particular rear lens surface which faces towards the shorter conjugated member), in addition to which, within the framework of the overall combination provided by the invention, the further dimensional rule is fulfilled according to which d. the negative value of the quotient resulting from the division of the sum of the lens refraction powers ($\phi_\beta + \phi_\gamma$) of the inner and of the third collecting meniscus, which latter is separated from the meniscal negative $N_1$ by an air gap and directly precedes it, by the sum of the surface refraction powers ($\phi_\beta' + \phi_\gamma'$) of the two rear dispersion surfaces of these two lenses, these surfaces being hollow towards the shorter conjugated member, is smaller than 1.500 but does not fall below 0.705.

2. High light intensity lens of extended GAUSS type in accordance with claim 1, characterized by the fact that (e) the meniscal collecting lens $P_{III} = L_\gamma$, preceding the negative $N_1$ situated at the last point in the front component Vgl, and occupying, as viewed in the direction of the light, the third position from the side of the longer conjugated member, is given the refraction power distribution required to ensure that the quotient resulting from dividing its lens refraction power ($\phi_\gamma = \phi_\gamma + \phi_\gamma'$) by the surface refraction power $\phi_\gamma'$ of the rear hollow surface associated with the air space S towards the negative $N_1$ is less than two thirds but greater than the lower limit of one third.

3. High light intensity lens in accordance with claim 2, characterized by the following data based on the focal length $F = 1$:

| Component | Lens | Radii | Thicknesses and vertex distances | | Refractive indices |
|---|---|---|---|---|---|
| $P_I$ | $L_\alpha$ | $R_1=+3.70$ | $d_1=0.085$ | | $n_1=1.490$ |
| | | $R'_1=\pm$ plan | | $s_{12}=0.002$ | |
| $P_{II}$ | $L_\beta$ | $R_2=+0.65$ | $d_2=0.073$ | | $n_2=1.745$ |
| | | $R'_2=+2.00$ | | $s_{23}=0.002$ | |
| (Vgl) | | | | | |
| $P_{III}$ | $L_\gamma$ | $R_3=+0.38$ | $d_3=0.068$ | | $n_3=1.717$ |
| | | $R'_3=+0.55$ | | $S=s_{34}=0.055$ | |
| $N_1$ | $L_4$ | $R_4=+0.75$ | $d_4=0.020$ | | $n_4=1.805$ |
| | | $R'_4=+0.28$ | | $s_{45}=CS=0.215$ | |
| $N_2$ | $\{L_{5a}$ | $R_5=-0.29$ | $d_{5a}=0.020$ | | $n_{5a}=1.600$ |
| | $\{L_{5b}$ | $R_{K5}=+2.00$ | $d_{5b}=0.106$ | | $n_{5b}=1.700$ |
| | | $R'_5=-0.44$ | | $s_{56}=0.001$ | |
| (Hgl) | | | | | |
| VI | $L_6$ | $R_6=+144.0$ | $d_6=0.062$ | | $n_6=1.745$ |
| | | $R'_6=-0.648$ | | | |

4. High light intensity lens in accordance with claim 2, characterized by the following data based on the focal distance $F=1$:

| Component | Lens | Radii | Thicknesses and vertex distances | | Glasses |
|---|---|---|---|---|---|
| $P_I$ | $L_\alpha$ | $R_1=+2.79966$ | $d_1=0.084348$ | | $n_1=1.50137/56.40$ |
| | | $R'_1=+10,6746$ | | $s_{12}=0.001733$ | |
| $P_{II}$ | $L_\beta$ | $R_2=+0.64507$ | $d_2=0.073949$ | | $n_2=1.74400/44.77$ |
| | | $R'_2=+1.91195$ | | $s_{23}=0.001733$ | |
| (Vgl) | | | | | |
| $P_{III}$ | $L_\gamma$ | $R_3=+0.37876$ | $d_3=0.067786$ | | $n_3=1.71700/47.99$ |
| | | $R'_3=+0.54666$ | | $(S)=s_{34}=0.056232$ | |
| $N_1$ | $L_4$ | $R_4=+0.74490$ | $d_4=0.019835$ | | $n_4=1.80518/25.43$ |
| | | $R'_4=+0.27596$ | | $s_{45}=CS=0.212988$ | |
| $N_2$ | $\{L_{5a}$ | $R_5=-0.29021$ | $d_{5a}=0.020220$ | | $n_{5a}=1.60565/37.83$ |
| | $\{L_{5b}$ | $R_{K5}=+2.22386$ | $d_{5b}=0.091281$ | | $n_{5b}=1.69680/55.43$ |
| | | $R'_5=-0.44054$ | | $s_{56}=0.001155$ | |
| (Hgl) | | | | | |
| VI | $L_6$ | $R_6=+192.575$ | $d_6=0.065283$ | | $n_6=1.74400/44.77$ |
| | | $R'_6=-0.60028$ | | | |

5. High light intensity lens in accordance with claim 2, characterized by the following data based on the focal length $F=1$:

| Component | Lens | Radii | Thicknesses and vertex distances | | Glasses |
|---|---|---|---|---|---|
| $P_I$ | $L_\alpha$ | $R_1=+4.23833$ | $d_1=0.085188$ | | $n_1=1.50137/56.40$ |
| | | $R'_1=+2.46661$ | | $s_{12}=0.001747$ | |
| $P_{II}$ | $L_\beta$ | $R_2=+0.63831$ | $d_2=0.097111$ | | $n_2=1.73520/41.58$ |
| | | $R'_2=+2.14858$ | | $s_{23}=0.002746$ | |
| (Vgl) | | | | | |
| $P_{III}$ | $L_\gamma$ | $R_3=+0.37976$ | $d_3=0.072343$ | | $n_3=1.61484/51.15$ |
| | | $R'_3=+0.63047$ | | $S=s_{34}=0.049630$ | |
| $N_1$ | $L_4$ | $R_4=+0.95863$ | $d_4=0.019948$ | | $n_4=1.80518/25.43$ |
| | | $R'_4=+0.28842$ | | $s_{45}=CS=0.198388$ | |
| $N_2$ | $\{L_{5a}$ | $R_5=-0.29357$ | $d_{5a}=0.020755$ | | $n_{5a}=1.59551/39.18$ |
| | $\{L_{5b}$ | $R_{K5}=+1.62057$ | $d_{5b}=0.097917$ | | $n_{5b}=1.69680/55.43$ |
| | | $R'_5=-0.44038$ | | $s_{56}=0.001670$ | |
| (Hgl) | | | | | |
| VI | $L_6$ | $R_6=+7.86312$ | $d_6=0.063339$ | | $n_6=1.74400/44.77$ |
| | | $R'_6=-0.67627$ | | | |
| | | | $OAL=0.710782$ | | |

6. High light intensity lens in accordance with claim 2, characterized by the following data based on the focal length $F = 1$:

| Component | Lens | Radii | Thicknesses and vertex distances | | Glasses |
|---|---|---|---|---|---|
| $P_I$ | $L_\alpha$ | $R_1=+1.42316$ | $d_1=0.083735$ | | $n_1=1.50437/56.40$ |
| | | $R'_1=+2.8388$ | | $s_{12}=0.001339$ | |
| $P_{II}$ | $L_\beta$ | $R_2=+0.63772$ | $d_2=0.071489$ | | $n_2=1.73520/41.58$ |
| (Vgl) | | $R'_2=+2.03910$ | | $s_{23}=0.000957$ | |
| $P_{III}$ | $L_\gamma$ | $R_3=+0.35615$ | $d_3=0.068350$ | | $n_3=1.72000/50.42$ |
| | | $R'_3=+0.50319$ | | $(S)=s_{34}=0.044221$ | |
| $N_I$ | $L_4$ | $R_4=+0.69137$ | $d_4=0.019039$ | | $n_4=1.80518/25.43$ |
| | | $R'_4=+0.26361$ | | $s_{45}=CS=0.212457$ | |
| $N_2$ | $L_{5a}$ | $R_5=-0.28612$ | $d_{5a}=0.019269$ | | $n_{5a}=1.61293/37.04$ |
| | $L_{5b}$ | $R_{K5}=+3.21051$ | $d_{5b}=0.085783$ | | $n_{5b}=1.69680/55.43$ |
| (Hgl) | | $R'_5=-0.44300$ | | $s_{56}=0.001129$ | |
| VI | $L_6$ | $R_6=-15.4433$ | $d_6=0.070953$ | | $n_6=1.74400/44.77$ |
| | | $R'_6=-0.54996$ | | | |

7. High light intensity lens in accordance with claim 1, characterized by the following data, referred to the focal length $F = 1$:

| Component | Lens | Radii | Thicknesses and vertex distances | | Refractive indices |
|---|---|---|---|---|---|
| $P_I$ | $L_\alpha$ | $R_1=+1.30$ | $d_1=0.070$ | | $n_1=1.515$ |
| | | $R'_1=+1.70$ | | $s_{12}=0.0010$ | |
| $P_{II}$ | $L_\beta$ | $R_2=+0.70$ | $d_2=0.080$ | | $n_2=1.700$ |
| (Vgl) | | $R'_2=+3.00$ | | $s_{23}=0.0010$ | |
| $P_{III}$ | $L_\gamma$ | $R_3=+0.40$ | $d_3=0.070$ | | $n_3=1.630$ |
| | | $R'_3=+0.75$ | | $S=s_{34}=0.0350$ | |
| $N_I$ | $L_{4a}$ | $R_4=+1.30$ | $d_{4a}=0.063$ | | $n_{4a}=1.770$ |
| | $L_{4b}$ | $R_{K4}=+3.00$ | $d_{4b}=0.015$ | | $n_{4b}=1.805$ |
| | | $R'_4=+0.30$ | | $s_{45}=CS=0.1900$ | |
| $N_2$ | $L_{5a}$ | $R_5=-0.28$ | $d_{5a}=0.020$ | | $n_{5a}=1.630$ |
| | $L_{5b}$ | $R_{K5}=+1.70$ | $d_{5b}=0.120$ | | $n_{5b}=1.700$ |
| (Hgl) | | $R'_5=-0.40$ | | $s_{56}=0.0015$ | |
| VI | $L_6$ | $R_6=+3.95$ | $d_6=0.073$ | | $n_6=1.744$ |
| | | $R'_6=-0.735$ | | | |

8. High light intensity lens in accordance with claim 1, characterized by the following data, based on the focal length $F = 1$:

| Component | Lens | Radii | Thicknesses and vertex distances | | Refractive indices |
|---|---|---|---|---|---|
| I | $L_1$ | $R_1=+4.30$ | $d_1=0.015$ | | $n_1=1.525$ |
| | | $R'_1=+2.15$ | | $s_{12}=0.015$ | |
| $P_I$ | $L_\alpha$ | $R_2=+2.20$ | $d_2=0.099$ | | $n_2=1.505$ |
| | | $R'_2=+190.0$ | | $s_{23}=0.002$ | |
| (Vgl) | | | | | |
| $P_{II}$ | $L_\beta$ | $R_3=+0.64$ | $d_3=0.095$ | | $n_3=1.740$ |
| | | $R'_3=+2.15$ | | $s_{34}=0.002$ | |
| | | $R_4=+0.38$ | | | |

| Component | Lens | Radii | Thicknesses and vertex distances | | Refractive indices |
|---|---|---|---|---|---|
| $P_{III}$ | $L_\gamma$ | $R'_4=+0.64$ | $d_4=0.070$ | | $n_4=1.615$ |
| | | $R_5=+0.96$ | | $S=s_{45}=0.053$ | |
| $N_1$ | $L_5$ | $R'_5=+0.29$ | $d_5=0.020$ | | $n_5=1.805$ |
| | | $R_6=-0.29$ | | $s_{56}=CS=0.190$ | |
| $N_2$ | $\{L_{6a}$ | $R_{K6}=+1.64$ | $d_{6a}=0.020$ | | $n_{6a}=1.600$ |
| | $L_{6b}$ | | $d_{6b}=0.095$ | | $n_{6b}=1.700$ |
| (Hgl) | | $R'_6=-0.44$ | | $s_{67}=0.002$ | |
| VII | $L_7$ | $R_7=+7.00$ | $d_7=0.070$ | | $n_7=1.740$ |
| | | $R'_7=-0.67$ | | | |

9. High light intensity lens in accordance with claim 1, characterized by the following data based on the focal length $F = 1$:

| Component | Lens | Radii | Thicknesses and vertex distances | | Refractive indices |
|---|---|---|---|---|---|
| | | $R_1=+4.30$ | | | |
| $P_I$ | $\{L_{1a}$ | $R_{K1}=+2.15$ | $d_{1a}=0.015$ | | $n_{1a}=1.525$ |
| | $L_{1b}$ | $R'_1=+215.0$ | $d_{1b}=0.070$ | | $n_{1b}=1.505$ |
| | | | | $a_{12}=0.002$ | |
| $P_{II}$ | $L_\beta$ | $R_2=+0.64$ | $d_2=0.095$ | | $n_2=1.740$ |
| (Vgl) | | $R'_2=+2.15$ | | | |
| | | | | $s_{23}=0.002$ | |
| $P_{III}$ | $L_\gamma$ | $R_3=+0.38$ | $d_3=0.070$ | | $n_3=1.615$ |
| | | $R'_3=+0.64$ | | | |
| | | $R_4=+0.96$ | | $S=s_{34}=0.053$ | |
| $N_1$ | $L_4$ | $R'_4=+0.29$ | $d_4=0.020$ | | $n_4=1.805$ |
| | | $R_5=-0.29$ | | $s_{45}=CS=0.190$ | |
| $N_2$ | $\{L_{5a}$ | $R_{K5}=+1.64$ | $d_{5a}=0.020$ | | $n_{5a}=1.600$ |
| | $L_{5b}$ | | $d_{5b}=0.095$ | | $n_{5b}=1.700$ |
| (Hgl) | | $R'_5=-0.44$ | | $s_{56}=0.002$ | |
| VI | $L_6$ | $R_6=+7.00$ | $d_6=0.070$ | | $n_6=1.740$ |
| | | $R'_6=-0.67$ | | | |

10. High light intensity lens in accordance with claim 1, characterized by the following data based on the focal length $F = 1$:

| Component | Lens | Radii | Thicknesses and vertex distances | | Glasses |
|---|---|---|---|---|---|
| $P_I$ | $L_\alpha$ | $R_1=+1.31010$ | $d_1=0.081965$ | | $n_1=1.50137/56.40$ |
| | | $R'_1=+1.67638$ | | | |
| | | | | $s_{12}=0.001039$ | |
| $P_{II}$ | $L_\beta$ | $R_2=+0.68748$ | $d_2=0.089236$ | | $n_2=1.69350/53.35$ |
| (Vgl) | | $R'_2=+3.15909$ | | | |
| | | | | $s_{23}=0.001000$ | |
| $P_{III}$ | $L_\gamma$ | $R_3=+0.40930$ | $d_3=0.078598$ | | $n_3=1.62608/38.96$ |
| | | $R'_3=+0.74605$ | | | |
| | | $R_4=+1.11784$ | | $(S)=s_{34}=0.057900$ | |
| $N_1$ | $L_4$ | $R'_4=+0.29955$ | $d_4=0.020082$ | | $n_4=1.80518/25.43$ |
| | | $R_5=-0.28139$ | | $s_{45}=CS=0.198535$ | |
| $N_2$ | $\{L_{5a}$ | $R_{K5}=+1.91981$ | $d_{5a}=0.019274$ | | $n_{5a}=1.60140/38.23$ |
| | $L_{5b}$ | | $d_{5b}=0.097911$ | | $n_{5b}=1.69680/55.43$ |
| (Hgl) | | $R'_5=-0.40228$ | | $s_{56}=0.001539$ | |
| VI | $L_6$ | $R_6=+4.22560$ | $d_6=0.063113$ | | $n_6=1.74400/44.77$ |
| | | $R'_6=-0.73871$ | | | |

\* \* \* \* \*

UNITED STATES PATENT OFFICE
CERTIFICATE OF CORRECTION

Patent No. 3,738,739          Dated June 12, 1973

Inventor(s) Erhard Glatzel et al.

It is certified that error appears in the above-identified patent and that said Letters Patent are hereby corrected as shown below:

On the cover sheet insert -- [30] Foreign Application Priority Data  Germany  P21 14 176.4  March 24, 1971 --.

Signed and sealed this 12th day of November 1974.

(SEAL)
Attest:

McCOY M. GIBSON JR.          C. MARSHALL DANN
Attesting Officer             Commissioner of Patents